Dec. 19, 1933.                J. H. WALKER ET AL                1,939,936
                                   PIPE JOINT
                             Filed June 27, 1932          5 Sheets-Sheet 1
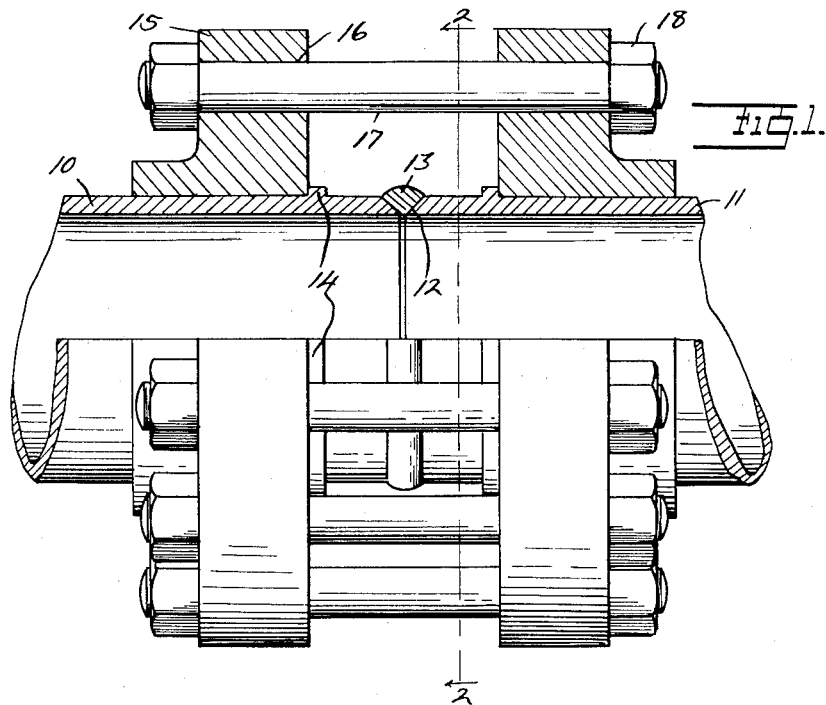
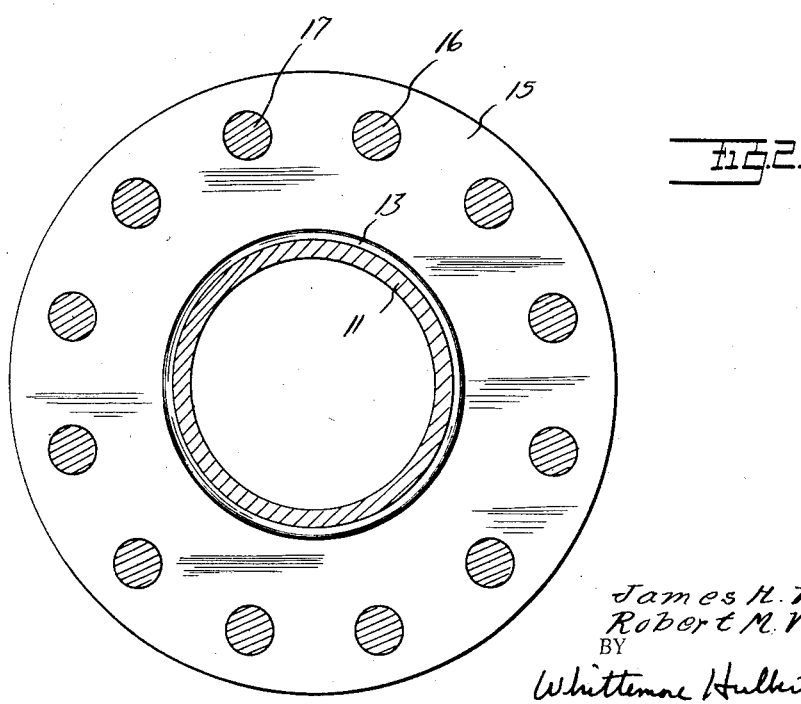
INVENTORS
James H. Walker
Robert M. Van Duzer Jr.
BY
Whittemore Hulbert Whittemore
                    ATTORNEYS Dec. 19, 1933.   J. H. WALKER ET AL   1,939,936
PIPE JOINT
Filed June 27, 1932   5 Sheets-Sheet 2
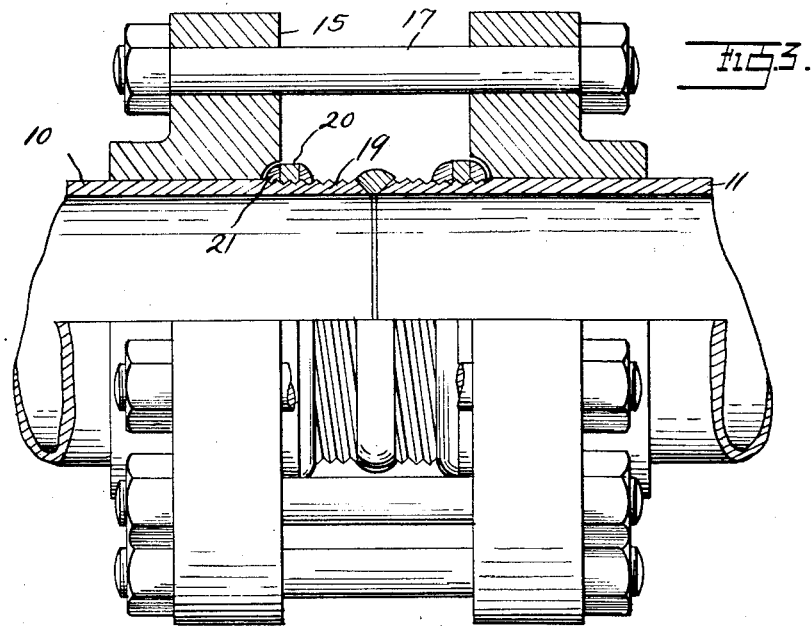
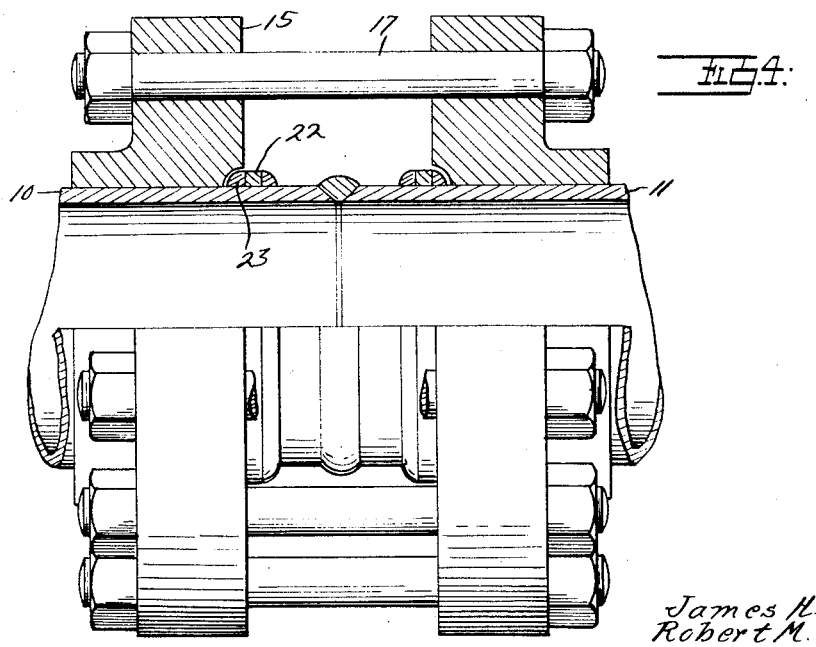
INVENTORS
James H. Walker
Robert M. VanDuzer Jr.
BY
Whittemore Hulbert Whittemore
+ Belknap   ATTORNEYS

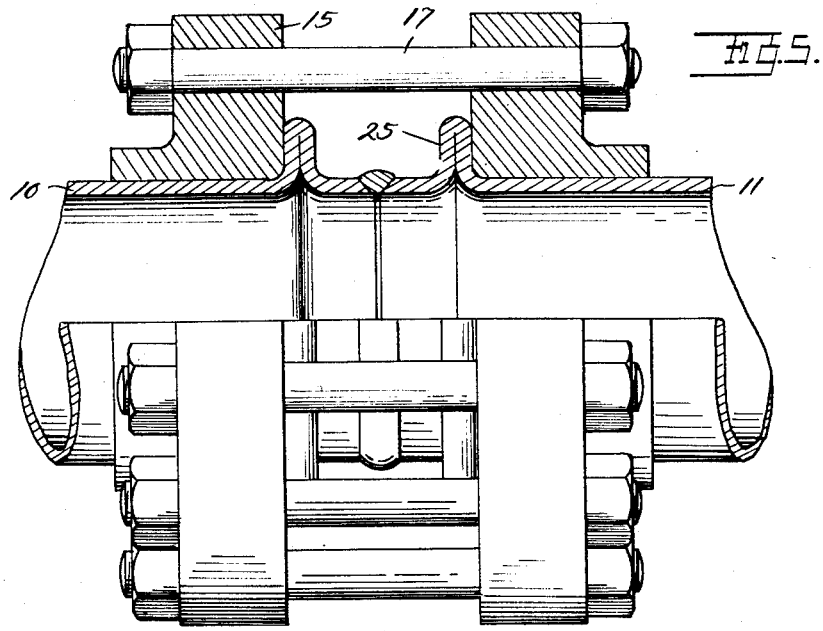
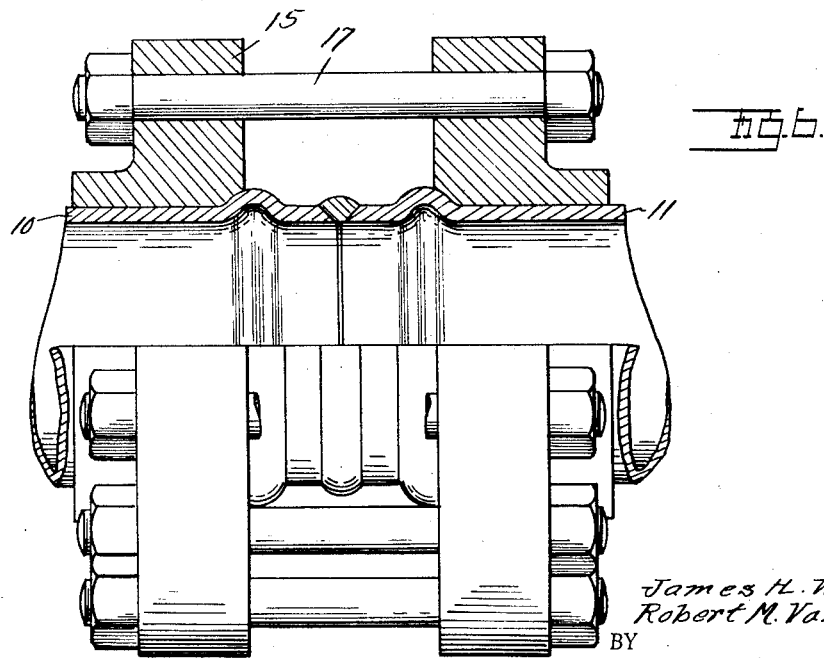

Dec. 19, 1933.     J. H. WALKER ET AL     1,939,936
PIPE JOINT
Filed June 27, 1932     5 Sheets-Sheet 4
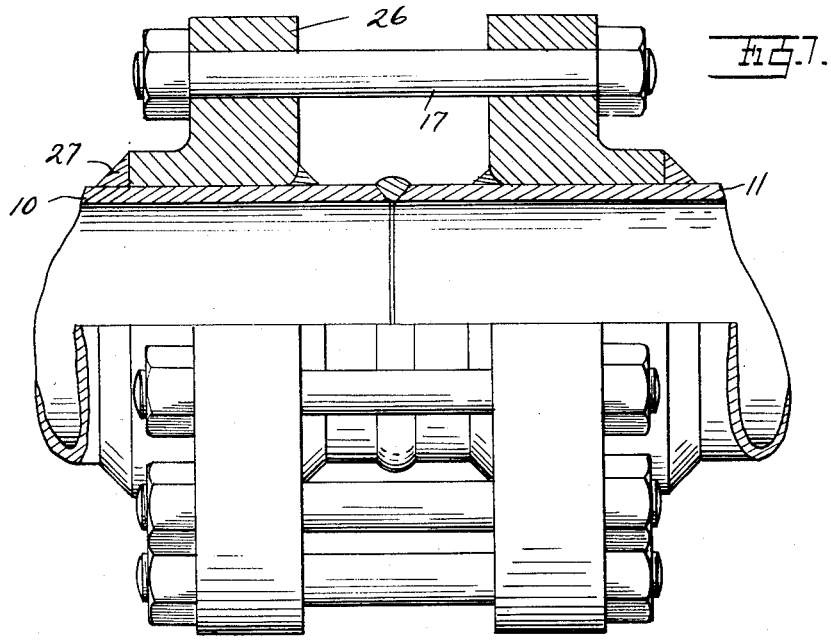
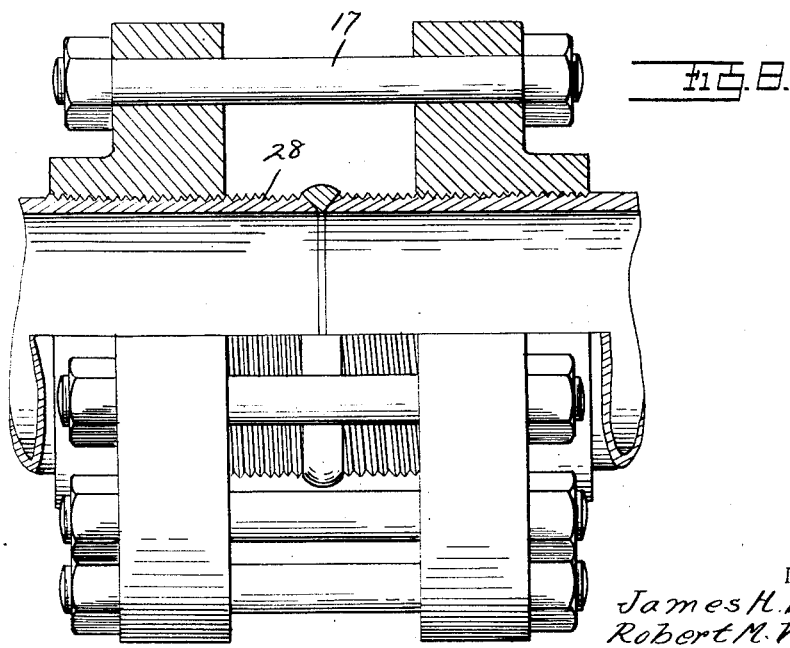
INVENTORS
James H. Walker
Robert M. VanDuzer, Jr.
BY
Whittemore Hulbert Whittemore
& Belknap     ATTORNEYS Dec. 19, 1933.    J. H. WALKER ET AL    1,939,936
PIPE JOINT
Filed June 27, 1932    5 Sheets-Sheet 5
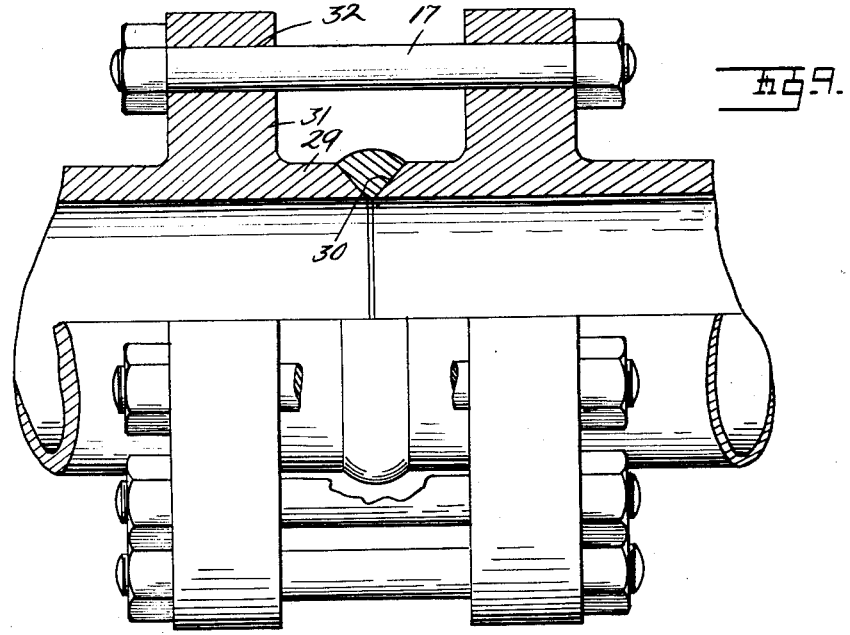
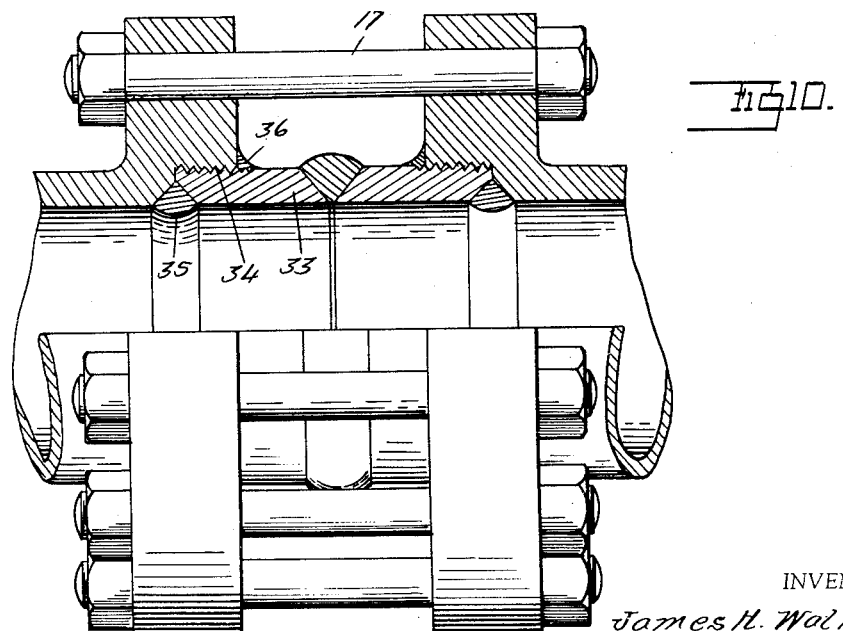
INVENTORS
James H. Walker
Robert M. VanDuzer Jr.
BY
Whittemore Hulbert Whittemore
+Belknap   ATTORNEYS Patented Dec. 19, 1933

1,939,936

UNITED STATES PATENT OFFICE 1,939,936

PIPE JOINT

James H. Walker, Birmingham, and Robert M. Van Duzer, Jr., Detroit, Mich.

Application June 27, 1932. Serial No. 619,540

7 Claims. (Cl. 285—111)

The invention relates to pipe joints and more particularly to constructions for joining pipes carrying fluids at high temperatures and pressures.

Our invention is a combination welded and mechanical joint. One of the important novel features is the use of a full strength weld together with such mechanical reinforcement as will insure adequate mechanical strength even though the weld itself may develop defects.

Another feature is the entire absence of the use of any gasket materials.

The invention will be best understood by referring to the accompanying drawings, wherein Figure 1 is a section through the joint made in accordance with the invention;

Figure 2 is a transverse section on the line 2—2 of Figure 1;

Figures 3 to 10 inclusive show fragmentary sections through pipes and fittings illustrating various ways of forming the abutments for the mechanical joints.

The joint as illustrated in Figures 1 and 2 comprises the two pipes 10 and 11, each of which is formed with a beveled end 12. When the pipes are placed in abutting relation this forms a groove of V-shaped cross section which may be filled with metal by any of the welding processes known in the art. 13 represents the welded material which, as shown, makes a full strength integral joint between the pipes 10 and 11.

A short distance from the ends of the pipes are arranged the lugs 14 which, as shown, are formed by a preliminary up-setting operation prior to the welding. The lugs are preferably machined into the form shown. Surrounding each of the pipes are the loose companion flanges 15 which slide on the outer surfaces of the pipes and abut the lugs 14. The companion flanges have apertures 16 through which bolts 17 are inserted, there being suitable nuts 18 for drawing the flanges against the lugs.

With the construction as described the ends of the pipes have the up-set lugs formed a sufficient distance from the weld to permit the weld to be made. The dimensions of the lugs 14 are such as to provide sufficient strength to prevent the joint from pulling apart axially in the event of a weld failure while the joint is in service.

The advantages of the joint above described over all prior pipe joints now in use are as follows:

1.—The joint is permanently tight and not subject to any maintenance, due to the absence of gaskets and the homogenous construction which is provided by the weld.

2.—The use of the backing-up flanges provides a safety factor on the weld, as mentioned above, thereby making a safer joint than can be obtained with the welded construction. This safety feature is important where joints are installed in high pressure and high temperature piping systems.

3.—The flanges and bolts used for backing-up purposes do not have to be of such heavy construction as would normally be used for a conventional bolted joint, as the purpose of these flanges is to hold the two parts joined together in case the weld should crack, thereby restraining the loose ends and preventing the escape of any large amount of the medium in the system. A design which provides sufficient strength to withstand two to three times the internal working pressure of the system is adequate in contrast to the flanges that are normally used in a bolted joint which will withstand 30 to 40 times the internal pressure.

4.—This joint can be dismantled, without destroying the parts that have been joined, by grinding, chipping, or gas cutting the deposited weld metal. This is not possible with other types of reinforced welded joints in which collars or straps are used as reinforcement, without re-fabricating the ends.

5.—The use of one of the so-called elaborate non-destructive weld test methods is not as essential with this reinforced weld as it is with a welded joint not provided with reinforcement. The only necessary test that must be applied to this type of joint is a hydrostatic test to indicate porosity.

Our invention is susceptible of considerable modification and Figures 3 to 10 show several alternative forms of construction. In Figure 3 the end of the pipe 10 is threaded as indicated at 19 for receiving the correspondingly threaded ring 20. The ring may be permanently secured in place by welding as indicated at 21.

In Figure 4 the ring 22 is not threaded to the pipe but is secured thereto entirely by welding as shown at 23.

In the construction shown in Figure 5 the projection for the companion flanges is formed by a return-bent annular flange 25 which, as shown, has the corrugations closely spaced.

In Figure 6 the corrugations are open.

In Figure 7 the companion flange 26 is directly welded to the pipe 10 as indicated at 27.

In Figure 8 the companion flange is threadedly secured to the pipe as shown at 28.

Figures 9 and 10 show two constructions which are particularly adapted where it is necessary to join fittings to pipe, fittings to fittings, valves to pipe, valves to fittings, or valves to valves. In this construction the extension 29 is cast integrally with the body of the casting and is formed with a beveled edge 30. The annular flange 31 of the fitting has apertures 32 therein for receiving the bolts for the mechanical connection. In Figure 10 the extension 33 is threaded into the fitting as indicated at 34 and is then welded at the points marked 35 and 36.

In all of the constructions thus far described the pipe joint is formed by a combination of welding and mechanical reinforcement. The use of welding insures a permanently tight joint with low up-keep or maintenance, while the bolted backing-up flanges insure the safety of the joint, particularly in case of joints subject to high pressure and temperature.

It is to be noted that in our invention the joint is made without any gasket material and the sealing effect is obtained entirely by the weld. Further, the weld is of such a type that under all normal conditions it is in itself sufficient not only to maintain the seal but also to maintain alignment of the pipes and to resist the axial stresses due to the pressure and temperature of the fluid within the pipe. It is known, however, that occasionally full strength welded joints develop defects such as to break the seal and permit escape of the fluid contents. Under such conditions there is always a possibility that the joint may give away entirely by an axial separation of the parts which, in the case of a fluid pipe operating under high temperature and pressure, might cause very serious damage.

With our improved joint, even though the weld may fail and permit escape of part of the fluid contents, there is no danger of a complete disruption of the joint because the mechanically held tension members are sufficient in strength to prevent the axial displacement of the joined pipes.

The mechanical connection between the pipes is not designed to maintain exact alignment of the pipes or to compensate for stresses in directions other than axial. In our construction the weld is relied upon for alignment and seal, and is adequate to take care of these conditions because it is a full strength weld.

One of the features of our invention is that the strength of the lugs, flanges and bolts used need not be more than enough to insure that the parts will withstand the axial stresses and the parts may safely be made with a much smaller factor of safety than could be used in the ordinary gasket-type of joints where there is no other means for resisting forces tending to misalign and unseal the joint.

What we claim as our invention is:

1. The method of joining tubular members having flanges integral with the ends thereof, which comprises recessing each flange for a portion of its thickness, inserting a pipe section within each recess, integrally uniting each section to its flange and its member, integrally uniting the sections, and mechanically uniting the flanges.

2. In a pipe joint, a pair of pipes, each having a flange projecting beyond, and integral with the ends thereof, a pipe section within the interior of the projecting portion of each of said flanges, means integrally connecting each section to its respective pipe, means integrally connecting said sections, and mechanical means rigidly connecting said flanges.

3. In a pipe joint, a pair of pipes having adjacent ends recessed and provided with laterally projecting flanges, pipe sections secured within the recessed ends of said pipes, a connection between said pipe sections including a full strength weld, and a mechanical connection between said flanges.

4. In a pipe joint, a pair of pipes having adjacent ends recessed and provided with laterally projecting flanges, pipe sections secured within the recessed ends of said pipes, means integrally connecting said sections, and means separate from the means just mentioned for connecting together said flanges.

5. In a pipe joint, a pair of axially aligned pipes having their adjacent ends provided with interiorly threaded portions and provided with laterally projecting flanges, pipe sections engaging said interiorly threaded portions and having beveled adjacent ends, means integrally connecting the beveled adjacent ends of said pipe sections including a full strength weld, and means connecting the flanges aforesaid including elements extending transversely of said flanges.

6. In a pipe joint, a pair of axially aligned pipes having their adjacent ends provided with interiorly threaded portions, pipe sections having exteriorly threaded portions engaging the interiorly threaded portions aforesaid and having adjacent ends beveled, means including welds securing the pipe sections to the pipes aforesaid, and means including a weld uniting the beveled ends of the pipe sections.

7. In a pipe joint, a pair of pipes having their adjacent ends recessed, pipe sections within said recesses and having their adjacent ends beveled, mechanical means rigidly connecting the pipe sections to the pipes, means integrally connecting said sections to said pipes, and means integrally connecting the beveled ends of said sections.

JAMES H. WALKER.
ROBERT M. VAN DUZER, Jr.